Nov. 20, 1951     T. EVANS     2,575,801
IMPLEMENT HITCH FOR TOOL BAR IMPLEMENTS
Filed June 8, 1950     2 SHEETS—SHEET 2
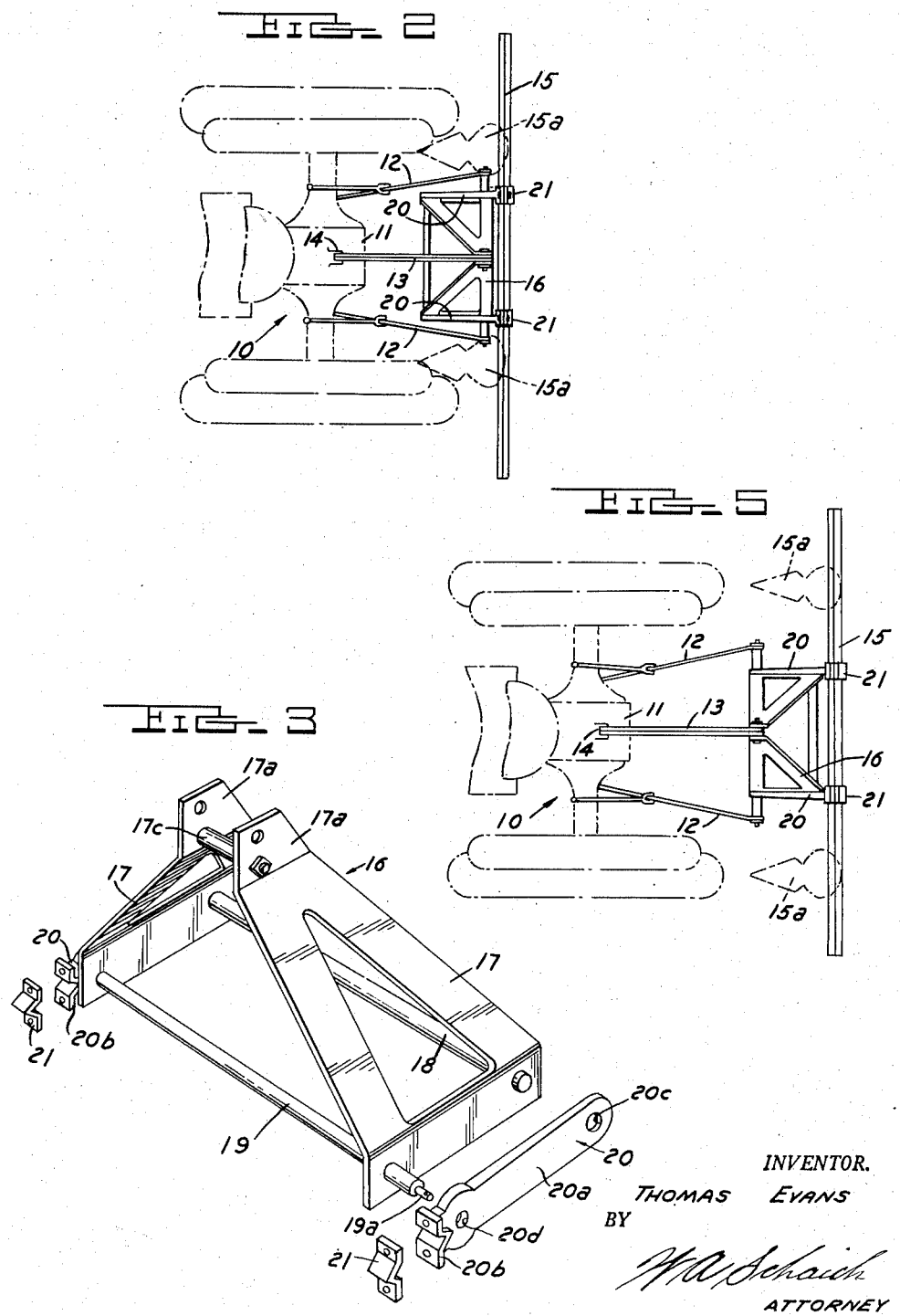
INVENTOR.
THOMAS EVANS
BY
ATTORNEY Patented Nov. 20, 1951

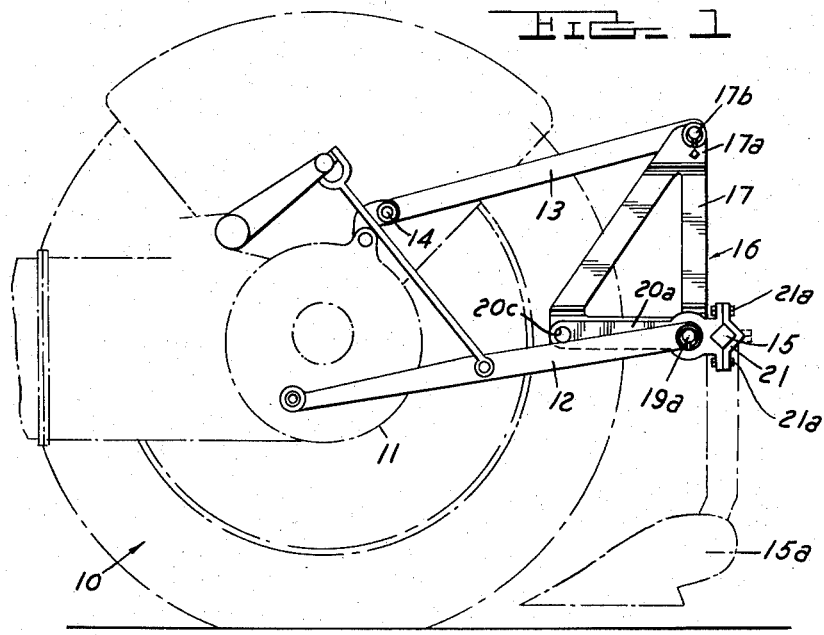
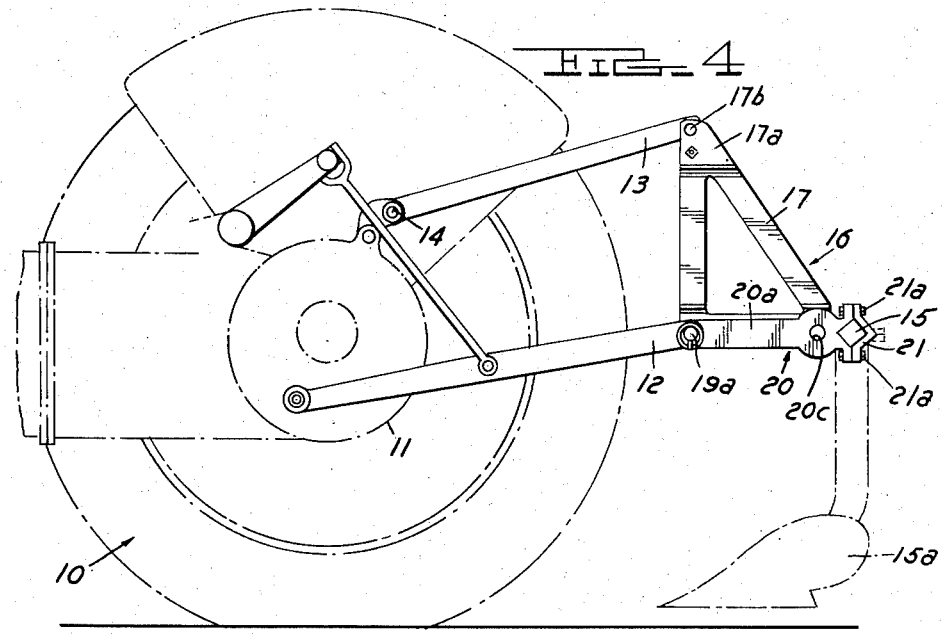

2,575,801

UNITED STATES PATENT OFFICE 2,575,801

IMPLEMENT HITCH FOR TOOL BAR IMPLEMENTS

Thomas Evans, Louisville, Ky., assignor, by mesne assignments, to Minneapolis-Moline Company, a corporation of Minnesota Application June 8, 1950, Serial No. 166,841

13 Claims. (Cl. 97—50)

This invention relates to an improved hitch for tool bar type implements, and particularly to a hitch for effecting the connection of the tool bar to a well known type of tractor having the so-called three link hitch arrangement.

Heretofore it has been found to be very convenient to mount various types of soil working implements in depending relationship to a transversely dispersed tool bar and then to effect this connection of the tool bar to a well known type of tractor by securing a so-called A-frame to the tool bar and providing laterally and vertically spaced pivot pins on such A-frame for connection respectively to the trailing hitch links of the well known three point implement hitch arrangement. It is, of course, equally recognized that the most effective implement operation is attained when the implement is coupled as closely as possible to the rear end of the tractor. Such close coupling is conveniently obtained with a tool bar type implement so long as the ground engaging implements may be disposed on either lateral side of the tractor rear wheels. However, there are many instances wherein the lateral location of the ground engaging implements necessarily coincides with the tractor rear wheels, in which case it is necessary that the longitudinal position of the tool bar be moved back a substantial distance rearwardly of the tractor rear wheels in order to prevent interference between the rear wheels and the ground engaging implements. Because of this condition, tool bar implements have heretofore been generally constructed to mount to the tractor in this extreme rearwardly displaced position, so as to assure that the tool bar could be employed by the farmer in all of his operations. Such mounting, of course, sacrifices all of the desirable effects obtainable in the more closely coupled position of the tool bar which is possible when employing implements which are laterally spaced relative to the tractor rear wheels.

Accordingly, it is an object of this invention to provide an improved implement hitch, particularly for tool bar type implements.

A particular object of this invention is to provide a hitch for a tool bar type implement which will permit the tool bar to be selectively positioned in either a close coupled position adjacent to the rear wheels of the tractor or an extended position wherein it is displaced a substantial distance rearwardly of the tractor rear wheels.

A further object of this invention is to provide an implement hitch for a tool bar for use with tractors of the type having laterally spaced, power-lifted, trailing hitch links wherein the same hitch frame may be reversibly mounted with respect to the tool bar to selectively position the tool bar in either of two longitudinally displaced positions relative to the tractor.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Fig. 1 is a side elevational view illustrating a tool bar type implement connected to a well known type of tractor by means of the hitch embodying this invention.

Fig. 2 is a reduced scale plan view of Fig. 1.

Fig. 3 is an enlarged scale perspective view of the hitch structure embodying this invention.

Fig. 4 is a side elevational view of the hitch structure embodying this invention showing it assembled to a well known type of tractor in its reversed position.

Fig. 5 is a reduced scale plan view of Fig. 4.

As shown on the drawings:

The implement embodying this invention is particularly useful with a well known type of tractor indicated generally by the numeral 10 having a pair of laterally spaced, power-lifted, trailing hitch links 12 mounted to the rear axle housing 11 and a central top link 13 trailingly pivoted to the top of the differential housing as at 14. Since this so-called three point hitch is well known in the art, further detailed description of the elements thereof is deemed to be unnecessary.

The improved hitch embodying this invention is particularly adaptable for connecting tool bar types of implements to the tractor. This type of implement generally incorporates a transversely extending rectangular bar 15 on which a plurality of ground engaging tools are mounted in laterally spaced, depending relationship. Such ground engaging tools may comprise plows, planters, cultivator sweeps, bedding discs, etc., or in the example diagrammatically shown on the drawings, may comprise a pair of middlebuster units 15a. Whatever the nature of the implement supported by the tool bar, it is sufficient to note that such implements are secured to the tool bar by conventional clamp elements (not shown).

To mount the tool bar 15 to the hitch links of the tractor, this invention provides a rigid upstanding frame structure 16 of the type commonly referred to in the art as an A-frame. The A-frame 16 may be conveniently formed by two side frame elements 17 of generally triangular configuration which have their bottom portions rigidly secured together in transversely spaced relationship by a pair of longitudinally spaced rods 18 and 19. Side frame elements 17 project upwardly and inwardly, terminating in parallel top portions 17a which are suitably spaced to receive the end of the tractor top link 13 therebetween and are pivotally attached to such top link by a pivot pin 17b. If desired, a spacer sleeve 17c (Fig. 3) may be bolted between the top portions 17a to maintain the proper spacing therebetween. Both of the rods 18 and 19 project laterally beyond each of the side frame elements 17 and one of the rods, in this case the rearmost rod 19, has laterally projecting ends 19a which extend a substantial distance beyond the side frame element 17, such ends being of reduced diameter.

A pair of identical tool bar supports 20 are provided, each of said supports having a body portion 20a terminating at one end in a clamp portion 20b. Clamp portion 20b is suitably shaped to surround approximately one-half of the tool bar 15 and may thus be rigidly clamped to the tool bar 15 through the cooperation of a clamp piece 21 and bolts 21a. The body portion 20a of each tool bar support has a pair of holes 20c and 20d therein which are longitudinally spaced and of suitable diameter to respectively receive the projecting ends of the transverse rods 18 and 19 of the A-frame 16. When each of the tool bar supports 20 are mounted on the projecting ends of the rods 18 and 19, and secured to the tool bar 15 by the clamp elements 21, it is apparent that the A-frame 16 is rigidly attached to the tool bar 15 and that no lateral or vertical displacement of the A-frame 16 relative to the tool bar supports 20 is possible. Accordingly, the tool bar 15 and its associated implements 15a may be bodily mounted on the tractor by the simple expedient of connecting the tractor draft links upon the extreme ends 19a of the rod 19, the extreme ends 19a thereby functioning as pivot pins for the mounting of the tractor hitch links. When thus mounted, it is obvious that the tool bar 15 and its associated implements 15a may be raised or lowered with respect to the ground by conventional operation of the tractor hydraulic system to raise or lower the hitch links.

With the described arrangement, it is apparent that the tool bar 15 is positioned in close coupled relationship with respect to the tractor and all of the advantages of such close coupling may be enjoyed. However, when the spacing of the tool bar carried implements 15a is such as to position the implements in line with the tractor rear wheels, as shown in Figs. 4 and 5, the described hitch may still be employed to effect the mounting of the tool bar implement to the tractor through the simple expedient of longitudinally reversing the A-frame 16 with respect to the tool bar supports 20. In the reversed position of the A-frame 16, shown in Figs. 4 and 5, the cross rod 19 with the laterally extended end portions 19a is now disposed forwardly of the other cross rod 18 and the hole 20c in the tool bar support 20 which formerly received the rod 19. Likewise, the hole 20d in the tool bar support 20 which formerly received the projecting ends of the rod 19 is now mounted on the projecting ends of the rod 18. The hitch links of the tractor are mounted to the same points on the A-frame 16, namely, the pivot pin 17b in the top of the A-frame 16 and the extreme lateral ends 19a of the rod 19. By so reversing the A-frame 16, the tool bar 15 is longitudinally positioned with respect to the tractor a substantial distance rearwardly of its former position and hence the tool bar implements 15a may be mounted on the tool bar 15 directly behind the tractor rear wheels without interference with such wheels.

Accordingly, it is apparent that this invention provides an unusually simple, rugged, and economically manufacturable implement hitch for tool bar types of implements which will permit the tool bar to be selectively mounted in a plurality of longitudinal positions with respect to the tractor without requiring any additional parts or any complicated reassembling operations.

It will, of course, be understood that many details of construction may be varied through a wide range without departing from the principles of this invention and it is, therefore, not the purpose to limit the patent granted hereon otherwise than necessitated by the scope of the appended claims.

I claim:

1. A tool bar implement hitch for a tractor having hitch mounting means at the rear thereof, comprising a frame having a pair of spaced substantially parallel bar portions, means on the frame for selectively reversably attaching the frame to said mounting means with said bar portions extending longitudinally in either forward or rearward directions relative to the place of attachment, a pair of tool bar supports each having tool bar clamping means at one end, means for rigidly securing one of said supports to each of said bar portions with the clamping means remote from the tractor to jointly support a tool bar, said securing means including identical longitudinally spaced interlocking portions on each bar portion adapted to interlock with identical longitudinally spaced portions on each tool bar support whereby said supports may be so secured to said bar portions regardless of the selected position in which the frame has been mounted to thereby vary the longitudinal spacing of the tool bar relative to the tractor.

2. A tool bar implement hitch for use with a tractor having upper and lower trailing draft links, comprising a rigid upstanding frame structure having means at its top for connection to the tractor upper link and means at its bottom for connection to the tractor lower link, said connection means being aligned on a transverse vertical plane when connected and the frame having support holding means arranged at right angles to said plane, each of said connection means being equilateral for selective reversable connection of the frame to the links for extension of said holding means in either longitudinally rearward or forward directions relative to said plane, an elongated tool bar support having a tool bar clamp at one end, and means for longitudinally reversably attaching the support to the support holding means with said one end remote from the tractor regardless of the selected connection of the frame to the links for varying the longitudinal spacing of the tool bar relative to the tractor.

3. A tool bar implement hitch for tractors having a pair of laterally spaced draft links and a central top link, a pair of tool bar supports each having an elongated body portion and a tool bar clamping means at one end, each tool bar body portion having an opening extending crosswise of its length, a mounting member for connecting the supports to the links, said member having upper and lower connections for selective longitudinally reversable connection of the member with the top and draft links respectively, and having a pair of transversely spaced lateral projections longitudinally spaced from said lower connection to lie at variable distances longitudinally from the member dependent on the selected position of the member, said projections adapted to fit said support openings for attachment of the supports to the mounting member, and each of said projections adapted to fit each of said support openings for attachment of the supports to the member in either of its selective positions.

4. A tool bar implement hitch for a tractor comprising a frame adapted to be mounted on the rear end of the tractor and having a pair of longitudinally spaced laterally extending pins at each side thereof, a pair of tool bar supports each having a pair of spaced apertures adapted to receive said pins for attachment of the supports to the frame and each of said supports having tool bar clamping means at one end for jointly supporting a transverse tool bar at the rear of the tractor, and each of said apertures adapted to receive each of said pins whereby the support may be longitudinally reversed relative to the frame to vary the longitudinal spacing of the clamping means relative to the tractor.

5. A tool bar implement hitch for a tractor comprising a frame adapted to be mounted on the rear end of the tractor and having a pair of longitudinally spaced laterally extending pins at each side thereof, a pair of tool bar supports each having a pair of spaced apertures adapted to receive said pins for attachment of the supports to the frame and each of said supports having tool bar clamping means at one end for jointly supporting a transverse tool bar at the rear of the tractor, each of said apertures adapted to receive each of said pins whereby the support may be longitudinally reversed relative to the frame to vary the longitudinal spacing of the clamping means relative to the tractor, and all of said pins lying on the same horizontal plane for supporting the tool bar at the same elevation regardless of the position of the supports relative to the frame.

6. A tool bar implement hitch for use with a tractor having a pair of laterally spaced, trailing draft links and a central top link comprising an upright frame having means at its top for connection to the top link and having a pair of transversely spaced laterally projecting pins below said means, a pair of tool bar supports, each support having a tool bar clamping means thereon and having an aperture therein proportioned to receive one of said pins for draft connection of the supports to the frame, cooperating means between the frame and each support preventing relative movement of the support about its draft connection, and said pins extending laterally beyond the supports for connection to the respective draft links to give the frame rigid support on the tractor and prevent lateral displacement of the supports from their respective carrying pins.

7. A tool bar implement hitch for use with a tractor having a pair of laterally spaced, power lifted, trailing draft links and a central top link, comprising a pair of upstanding frame elements having laterally spaced bottom portions and top portions inclined toward each other to define a mounting bracket to receive the tractor top link, a pair of longitudinally spaced rods rigidly interconnecting the bottom portions of said frame elements, each of said rods having ends projecting laterally beyond said frame elements, a pair of tool bar supports each having an elongated body portion and tool bar securing means at one end, said body portions each having a pair of apertures therein for respectively receiving the rod ends projecting beyond one of said frame elements, the projecting ends of one of said rods being constructed and arranged for connection to the tractor hitch links.

8. A tool bar implement hitch for use with a tractor having a pair of laterally spaced power lifted trailing draft links and a central top link, comprising a pair of upstanding frame elements having laterally spaced bottom portions and top portions inclined toward each other to define a mounting bracket to receive the tractor top link, a pair of longitudinally spaced rods rigidly interconnecting the bottom portions of said frame elements, each of said rods having ends projecting laterally beyond said frame elements, a pair of tool bar supports each having an elongated body portion and tool bar securing means at one end, said body portions each having a pair of apertures therein for respectively receiving the rod ends projecting beyond one of said frame elements, the projecting ends of one of said rods being constructed and arranged for connection to the tractor hitch links, and a transverse tool bar rigidly secured to said securing means on said tool bar supports, thereby anchoring said tool bar supports against lateral displacement relative to said rods.

9. A tool bar implement hitch for use with a tractor having a pair of laterally spaced, power lifted trailing draft links and a central top link, comprising a rigid upstanding frame structure having means at its top for connection to the tractor top link and a pair of transversely spaced, laterally projecting pins at its bottom for connection respectively to the tractor hitch links, and a pair of tool bar supports, each having tool bar clamping means at one end and each having a pair of longitudinally spaced apertures therein, each of said apertures being proportioned to selectively receive one of said laterally projecting pins, whereby said frame structure may be longitudinally reversibly mounted relative to said tool bar supports to vary the longitudinal spacing of the tool bar relative to the tractor, and means on said frame structure cooperating with the other aperture of each of said tool bar supports to rigidly position said tool bar supports relative to said frame structure.

10. A tool bar implement hitch for use with a tractor having a pair of laterally spaced, power lifted, trailing draft links and a central top link, comprising a rigid A-frame structure having means at the top for connection to the tractor top link and a longitudinally elongated bottom portion, a pair of transversely projecting pivot pins respectively mounted on opposite sides of the bottom portion of said A-frame and adjacent one longitudinal end thereof, said pivot pins being adapted for connection to the tractor hitch links, and a pair of tool bar supports, each having tool bar fastening means at one end and each having a pair of longitudinally spaced apertures therein, each of said apertures being proportioned to receive one of said laterally projecting pins, whereby said A-frame may be longitudinally reversibly mounted relative to said tool bar supports to vary the longitudinal spacing of the tool bar relative to the tractor, and means on said A-frame cooperating with the other aperture of each of said tool bar supports to rigidly position said tool bar supports relative to said frame structure.

11. The combination defined in claim 10 wherein said projecting pins respectively comprise opposite ends of a single transverse rod.

12. A tool bar implement hitch for use with a tractor having a pair of laterally spaced, power lifted, trailing draft links and a central top link, comprising a rigid A-frame structure having means at the top for connection to the tractor top link and a longitudinally elongated bottom portion, a pair of transversely projecting pivot pins respectively mounted on opposite sides of the bottom portion of said A-frame, a pair of transversely projecting anchor pins respectively mounted on opposite sides of the bottom portion of said A-frame in longitudinally spaced relationship with respect to said pivot pins, and a pair of tool bar supports, each having tool bar fastening means at one end and each having a pair of longitudinally spaced apertures therein constructed and arranged to respectively receive the pivot pin and anchor pin on one side of said A-frame, whereby said A-frame may be longitudinally reversibly mounted relative to said tool bar supports to vary the longitudinal spacing of the tool bar relative to the tractor.

13. The combination defined in claim 12 wherein said pivot pins constitute opposite ends of a first rod, and said anchor pins constitute opposite ends of a second rod.

THOMAS EVANS.

REFERENCES CITED

The following references are of record in the file of this patent:

UNITED STATES PATENTS

| Number | Name | Date |
| --- | --- | --- |
| 2,145,007 | Foster | Jan. 24, 1939 |

FOREIGN PATENTS

| Number | Country | Date |
| --- | --- | --- |
| 565,167 | Great Britain | Oct. 30, 1944 |